(12) United States Patent
Pervan et al.

(10) Patent No.: US 7,634,884 B2
(45) Date of Patent: *Dec. 22, 2009

(54) MECHANICAL LOCKING SYSTEM FOR PANELS AND METHOD OF INSTALLING SAME

(75) Inventors: Darko Pervan, Viken (SE); Marcus Bergelin, Lerberget (SE)

(73) Assignee: Valinge Innovation AG, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/051,656

(22) Filed: Mar. 19, 2008

(65) Prior Publication Data

US 2008/0155930 A1 Jul. 3, 2008

Related U.S. Application Data

(63) Continuation of application No. 11/092,748, filed on Mar. 30, 2005, and a continuation of application No. 11/575,600, filed as application No. PCT/SE2005/001586 on Oct. 21, 2005.

(30) Foreign Application Priority Data

Oct. 22, 2004 (EP) .................................. 04025167

(51) Int. Cl.
*E04B 2/00* (2006.01)
(52) U.S. Cl. ...................... 52/582.1; 52/588.1; 52/391; 428/50

(58) Field of Classification Search .................. 52/390, 52/392, 533, 534, 539, 553, 578, 582.1, 586.1, 52/586.2, 588.1, 589.1, 590.2, 590.3, 591.1, 52/591.2, 591.3, 571.4, 591.5, 592.1, 592.2, 52/592.4, 745.08, 745.19, 747.1, 747.11, 52/748.1, 748.11; 403/334, 345, 364–368, 403/372, 375, 376, 381; 404/34, 35, 40, 404/41, 46, 47, 49–58, 68, 70; 428/44, 47–50, 428/57, 58, 60, 61, 106, 192–194
See application file for complete search history.

(56) References Cited

U.S. PATENT DOCUMENTS

| 124,228 | A | 3/1872 | Stuart |
| 1,809,393 | A | 6/1931 | Rockwell |
| 1,902,716 | A | 3/1933 | Newton |

(Continued)

FOREIGN PATENT DOCUMENTS

EP 0 974 713 A1 12/2005

(Continued)

OTHER PUBLICATIONS

European Search Report (ESR) for European Application 04025167.0, filed Oct. 22, 2004, published as EP 1 650 375 A1, on Apr. 26, 2006.

(Continued)

*Primary Examiner*—Richard E. Chilcot, Jr.
*Assistant Examiner*—William V Gilbert
(74) *Attorney, Agent, or Firm*—Buchanan Ingersoll & Rooney PC

(57) ABSTRACT

Floor panels are provided with a mechanical locking system including a flexible locking element in a locking groove, which during a horizontal motion is displaced vertically.

12 Claims, 10 Drawing Sheets

U.S. PATENT DOCUMENTS

| | | | |
|---|---|---|---|
| 2,026,511 A | 12/1935 | Storm | |
| 2,596,280 A | 5/1952 | Nystrom | |
| 2,740,167 A | 4/1956 | Rowley | |
| 2,865,058 A | 12/1958 | Andersson | |
| 3,023,681 A | 3/1962 | Worson | |
| 3,378,958 A | 4/1968 | Parks, et al. | |
| 3,517,927 A * | 6/1970 | Kennel | 482/128 |
| 3,526,071 A | 9/1970 | Watanabe | |
| 3,572,224 A | 3/1971 | Perry | |
| 3,579,941 A | 5/1971 | Tibbals | |
| 3,742,669 A | 7/1973 | Mansfeld | |
| 3,849,235 A | 11/1974 | Gwynne | |
| 3,919,820 A | 11/1975 | Green | |
| 4,113,399 A | 9/1978 | Hansen, Sr. | |
| 4,299,070 A | 11/1981 | Oltmanns et al. | |
| 5,148,850 A | 9/1992 | Urbanick | |
| 5,247,773 A | 9/1993 | Weir | |
| 5,465,546 A | 11/1995 | Buse | |
| 5,618,602 A | 4/1997 | Nelson | |
| 5,755,068 A * | 5/1998 | Ormiston | 52/314 |
| 5,899,038 A | 5/1999 | Stroppiana | |
| 6,052,960 A | 4/2000 | Yonemura | |
| 6,173,548 B1 | 1/2001 | Hamar et al. | |
| 6,314,701 B1 | 11/2001 | Meyerson | |
| 6,363,677 B1 | 4/2002 | Chen et al. | |
| 6,385,936 B1 | 5/2002 | Schneider | |
| 6,505,452 B1 | 1/2003 | Hannig | |
| 6,591,568 B1 | 7/2003 | Palsson | |
| 6,601,359 B2 | 8/2003 | Olofsson | |
| 6,647,689 B2 | 11/2003 | Pletzer | |
| 6,647,690 B1 | 11/2003 | Martensson | |
| 6,769,219 B2 | 8/2004 | Schwitte et al. | |
| 6,854,235 B2 | 2/2005 | Martensson | |
| 2002/0178674 A1 | 12/2002 | Pervan | |
| 2003/0037504 A1 | 2/2003 | Schwitte et al. | |
| 2003/0180091 A1 | 9/2003 | Stridsman | |
| 2003/0196405 A1 | 10/2003 | Pervan | |
| 2004/0031227 A1 | 2/2004 | Knauseder | |
| 2004/0060255 A1 | 4/2004 | Knauseder | |
| 2004/0168392 A1 | 9/2004 | Konzelmann et al. | |
| 2004/0182036 A1 | 9/2004 | Sjöberg et al. | |
| 2004/0200175 A1 | 10/2004 | Weber | |
| 2004/0211143 A1 * | 10/2004 | Hanning | 52/578 |
| 2005/0235593 A1 | 10/2005 | Hecht | |
| 2006/0070333 A1 | 4/2006 | Pervan | |
| 2006/0101769 A1 | 5/2006 | Pervan et al. | |
| 2006/0260254 A1 | 11/2006 | Pervan | |
| 2007/0028547 A1 | 2/2007 | Grafenauer | |
| 2007/0151189 A1 | 7/2007 | Yang | |
| 2007/0193178 A1 | 8/2007 | Groeke et al. | |

FOREIGN PATENT DOCUMENTS

| | | | |
|---|---|---|---|
| JP | 5-018028 | | 1/1993 |
| WO | WO 00/47841 | * | 8/2000 |
| WO | WO 01/51732 A1 | | 7/2001 |
| WO | 03/083234 A1 | | 10/2003 |
| WO | 03/087497 A1 | | 10/2003 |
| WO | 2004/020764 A1 | | 3/2004 |

OTHER PUBLICATIONS

International Search Report (ISR) for International Application PCT/SE2005/001586, filed Oct. 21, 2005, published as WO 2006/043893 A1 on Apr. 27, 2006.
International Search Report (ISR) for International Application PCT/SE2006/000033, filed Jan. 10, 2006, published as WO 2006/104436 A1 on Oct. 5, 2006.
U.S. Appl. No. 12/073,477, filed Mar. 5, 2008, Pervan.
U.S. Appl. No. 11/000,912, filed Dec. 2, 2004, Pervan.
U.S. Appl. No. 11/822,722, filed Jul. 9, 2007, Pervan.
U.S. Appl. No. 11/822,681, filed Jul. 9, 2007, Pervan, et al.
U.S. Appl. No. 11/575,600, filed Dec. 7, 2007, Pervan, et al.
U.S. Appl. No. 11/889,351, filed Aug. 10, 2007, Pervan.
U.S. Appl. No. 12/216,892, filed Jul. 11, 2008, Pervan, et al.
U.S. Appl. No. 11/092,748, filed Mar. 30, 2005, Pervan.
U.S. Appl. No. 11/822,723, filed Jul. 9, 2007, Pervan.
U.S. Appl. No. 11/950,085, filed Dec. 4, 2007, Pervan.
U.S. Appl. No. 11/775,885, filed Jul. 11, 2007, Pervan.
U.S. Appl. No. 11/770,771, filed Jun. 29, 2007, Pervan, et al.
U.S. Appl. No. 11/822,710, filed Jul. 9, 2007, Pervan.
U.S. Appl. No. 11/923,836, filed Oct. 25, 2007, Pervan.
U.S. Appl. No. 11/952,212, filed Dec. 7, 2007, Pervan.
U.S. Appl. No. 12/362,977, filed Jan. 30, 2009, Pervan, et al.
U.S. Appl. No. 12/518,584, filed Jun. 10, 2009, Pervan, et al.
U.S. Appl. No. 10/970,282, filed Oct. 22, 2004, Pervan, et al.

* cited by examiner

PRIOR ART

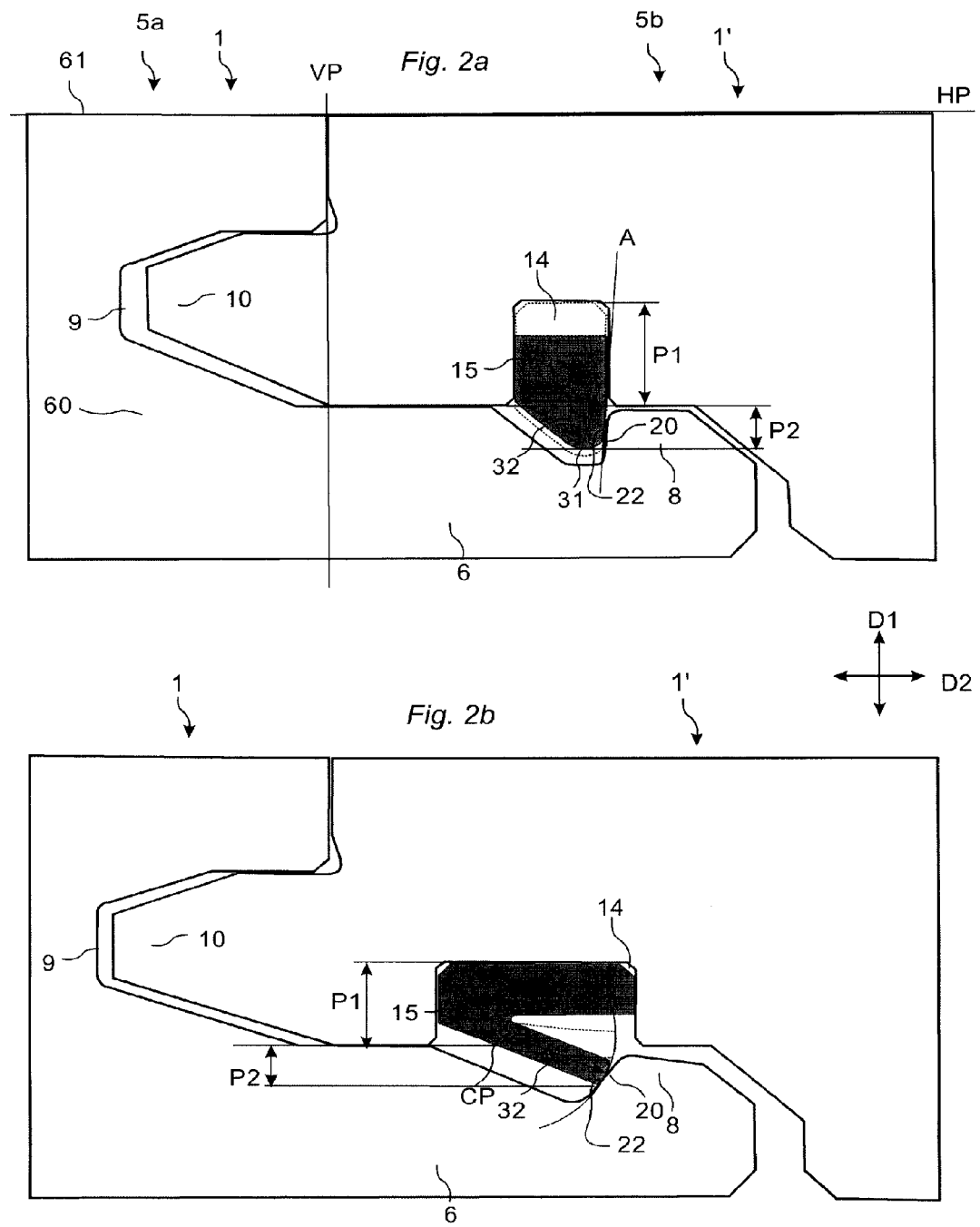

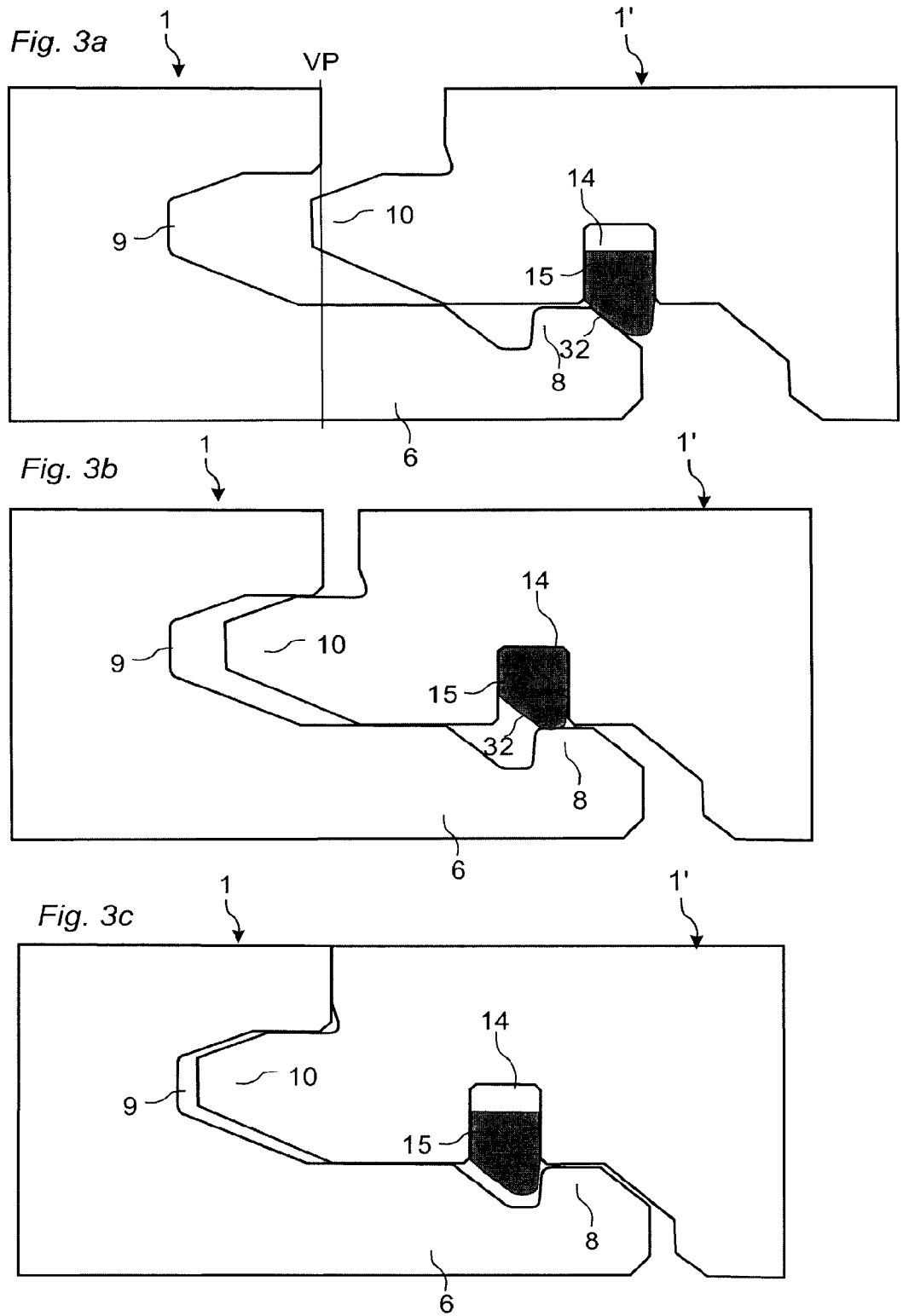

Fig. 6a
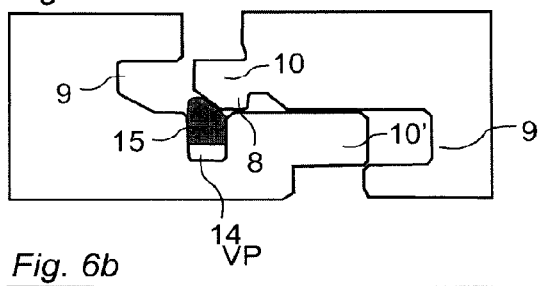 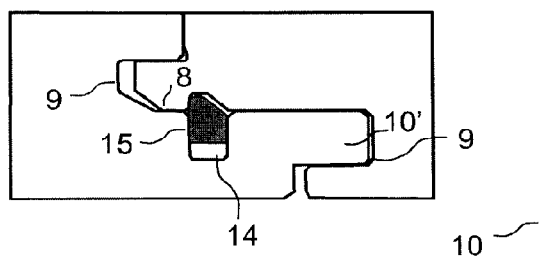
Fig. 6b
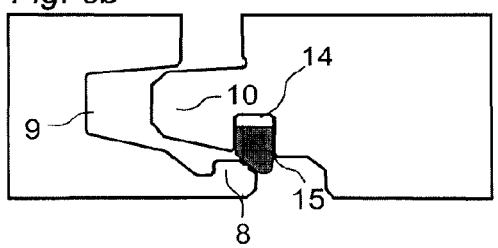 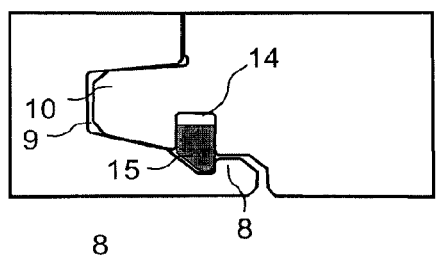
Fig. 6c
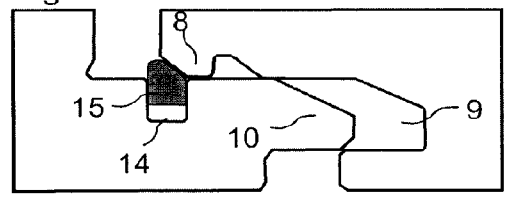 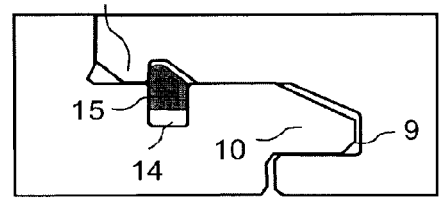
Fig. 6d
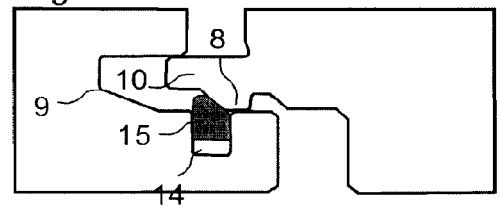 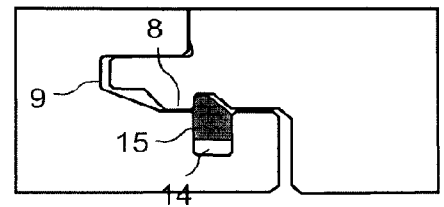
Fig. 6e
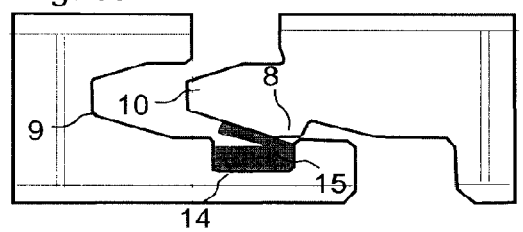 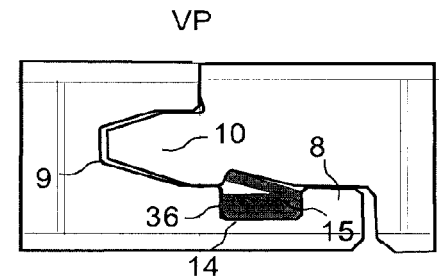

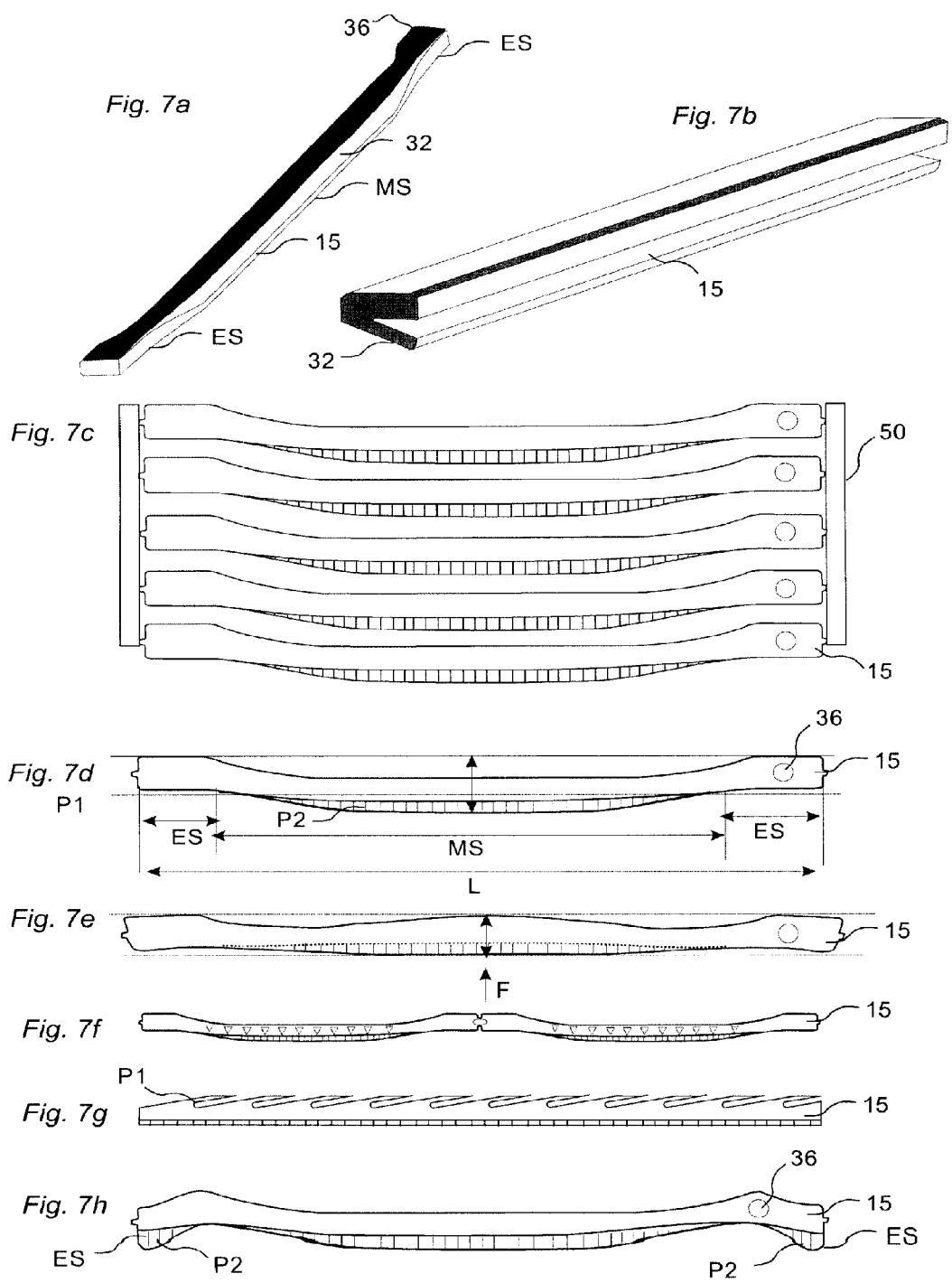

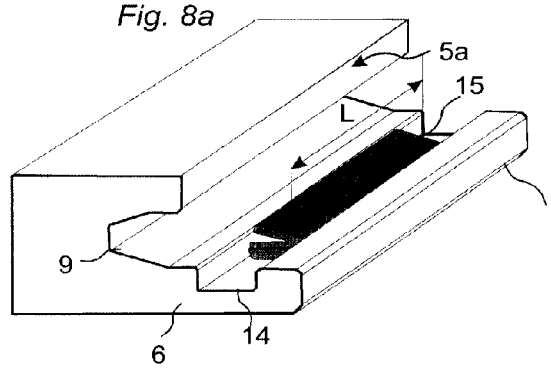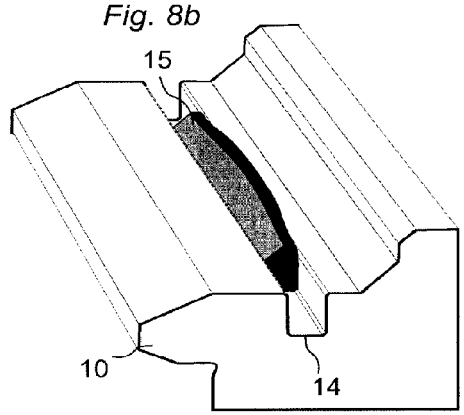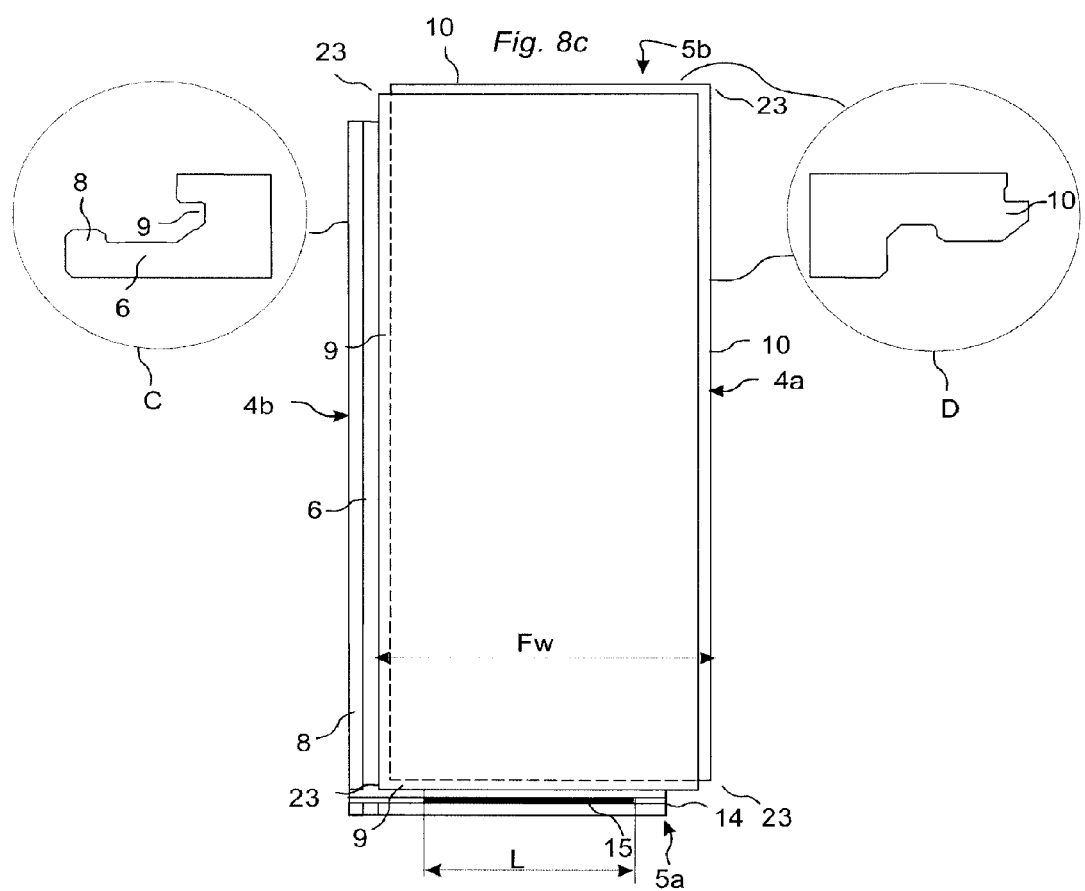

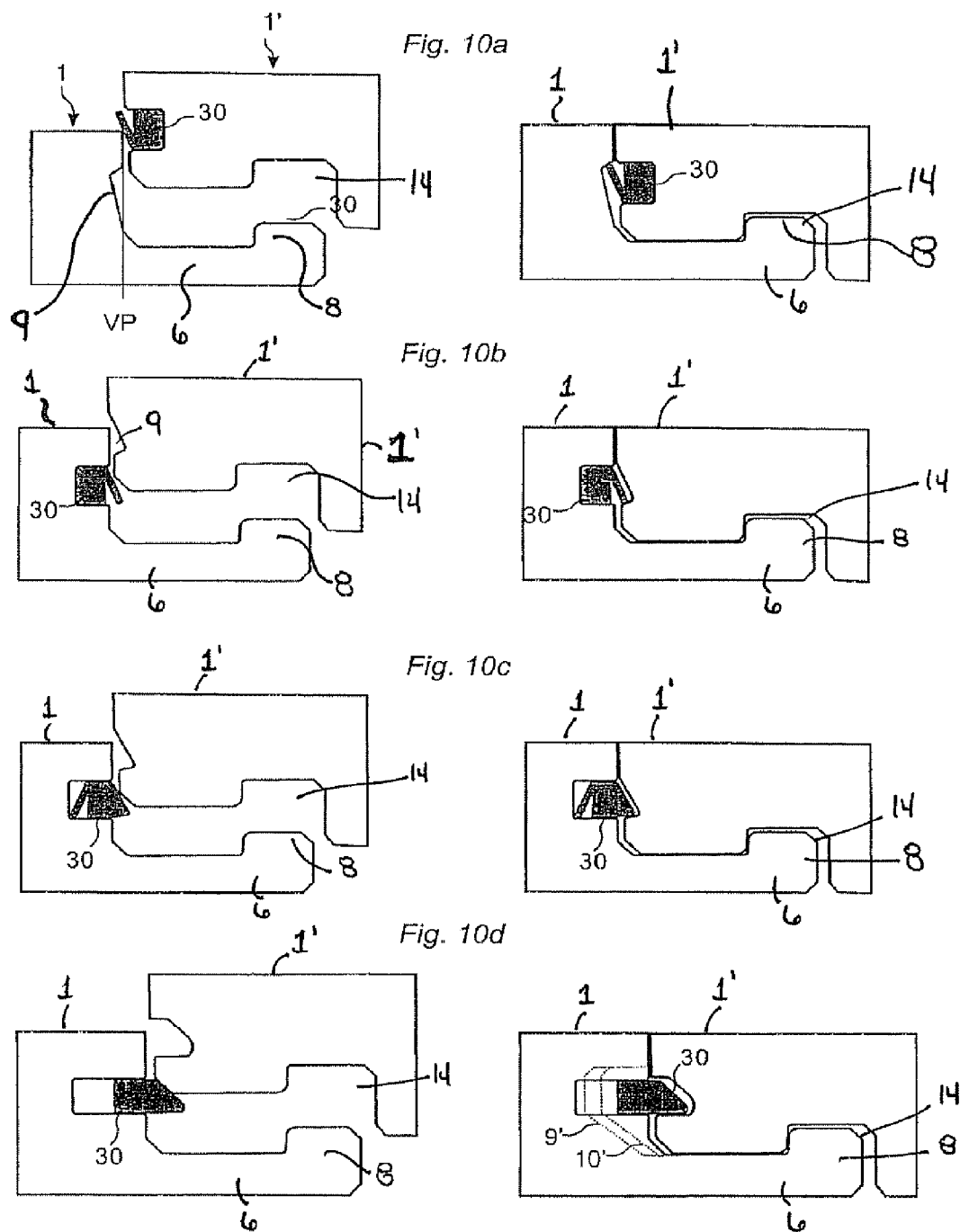

MECHANICAL LOCKING SYSTEM FOR PANELS AND METHOD OF INSTALLING SAME

CROSS-REFERENCE TO RELATED APPLICATIONS

The present application is a continuation of U.S. Ser. No. 11/092,748, filed on Mar. 30, 2005 and U.S. Ser. No. 11/575,600, filed on Mar. 20, 2007, U.S. Ser. No. 11/575,600 is a national stage application of PCT/SE2005/001586. The entire contents of U.S. Ser. No. 11/092,748 and U.S. Ser. No. 11/575,600 are hereby incorporated herein by reference.

TECHNICAL FIELD

The invention generally relates to the field of mechanical locking systems for floor panels and building panels.

FIELD OF APPLICATION OF THE INVENTION

The present invention is particularly suitable for use in floating floors, which are formed of floor panels which are joined mechanically with a locking system integrated with the floor panel, i.e., mounted at the factory, are made up of one or more upper layers of veneer, decorative laminate or decorative plastic material, an intermediate core of wood-fiber-based material or plastic material and preferably a lower balancing layer on the rear side of the core. The following description of known techniques, problems of known systems and objects and features of the invention will therefore, as a non-restrictive example, be aimed above all at this field of application and in particular laminate flooring formed as rectangular floor panels with long and short sides intended to be mechanically joined on both long and short sides. The long and short sides are mainly used to simplify the description of the invention. The panels could be square. It should be emphasized that the invention can be used in any panel and it could be combined with all types of known locking systems, where the floor panels are intended to be joined using a mechanical locking system connecting the panels in the horizontal and vertical directions on at least two adjacent sides. The invention can thus also be applicable to, for instance, solid wooden floors, parquet floors with a core of wood or wood-fibre-based material and a surface of wood or wood veneer and the like, floors with a printed and preferably also varnished surface, floors with a surface layer of plastic or cork, linoleum, rubber. Even floors with hard surfaces such as stone, tile and similar are included and floorings with soft wear layer, for instance needle felt glued to a board. The invention can also be used for joining building panels which preferably contain a board material for instance wall panels, ceilings, furniture components and similar.

BACKGROUND OF THE INVENTION

Laminate flooring usually comprises a core of a 6-12 mm fibre board, a 0.2-0.8 mm thick upper decorative surface layer of laminate and a 0.1-0.6 mm thick lower balancing layer of laminate, plastic, paper or like material. A laminate surface comprises melamine impregnated paper. The most common core material is fibreboard with high density and good stability usually called HDF—High Density Fibreboard. Sometimes also MDF—Medium Density Fibreboard—is used as core.

Traditional laminate floor panels of this type have been joined by means of glued tongue-and-groove joints.

In addition to such traditional floors, floor panels have been developed which do not require the use of glue and instead are joined mechanically by means of so-called mechanical locking systems. These systems comprise locking systems, which lock the panels horizontally and vertically. The mechanical locking systems are usually formed by machining of the core of the panel. Alternatively, parts of the locking system can be formed of a separate material, for instance aluminium or HDF, which is integrated with the floor panel, i.e., joined with the floor panel in connection with the manufacture thereof.

The main advantages of floating floors with mechanical locking systems are that they are easy to install. They can also easily be taken up again and used once more at a different location.

DEFINITION OF SOME TERMS

In the following text, the visible surface of the installed floor panel is called "front side", while the opposite side of the floor panel, facing the sub floor, is called "rear side". The edge between the front and rear side is called "joint edge". By "horizontal plane" is meant a plane, which extends parallel to the outer part of the surface layer. Immediately juxtaposed upper parts of two adjacent joint edges of two joined floor panels together define a "vertical plane" perpendicular to the horizontal plane.

By "locking systems" are meant co-acting connectors which connect the floor panels vertically and/or horizontally. By "mechanical locking system" is meant that joining can take place without glue. Mechanical locking systems can in many cases also be joined by gluing. By "integrated with" means formed in one piece with the panel or a separate material factory connected to the panel.

Known Techniques and Problems Thereof

For mechanical joining of long sides as well as short sides in the vertical and horizontal direction (direction D1, D2) several methods could be used. One of the most used methods is the angle-snap method. The long sides are installed by angling. The panel is than displaced in locked position along the long side. The short sides are locked by horizontal snapping as shown in FIGS. 1a-1c. The vertical connection is a tongue 10 and a groove 9 during the horizontal displacement, a strip 6 with a locking element 8 is bent and when the edges are in contact, the strip springs back and a locking element 8 enters a locking groove 14 and locks the panels horizontally. The vertical displacement of the locking element during the snapping action is caused by the bending of the strip. Such a snap connection is complicated since a hammer and a tapping block is frequently used to overcome the friction between the long edges and to bend the strip during the snapping action. The friction on the long side could be reduced and the panels could be displaced without tools. The snapping resistance is however considerable, especially in locking systems made in one piece with the core. Wood based materials are generally difficult to bend. Cracks in the panel may occur during snapping and the locking element must be rather small in the vertical direction in order to allow snapping.

It is known that a snap system could have a separate plastic strip 6', integrated with the panel and with a resilient part as shown in FIGS. 1d-1f. Such a locking system could be locked with less resistance than the traditional one-piece snap system. This locking system has however several disadvantages. The plastic strip is used to replace both the tongue and the strip with a locking element. The material cost is therefore high and the locking system is generally not compatible with the locking system used in old panels. The groove 9 is difficult to produce since it must have a locking element 8'. In fact 4 locking elements, two flexible locking elements on the strip and two (8,8') in the panel, must be used to lock in the horizontal direction. It is difficult to fix the plastic strip over the whole length of the short side. This means that corner portions will not have any tongue and this could cause problems in some applications.

SUMMARY AND OBJECTS

A first overall objective is to provide a locking system, which could be locked by horizontal snapping and with less snapping resistance than the known systems. The costs and functions should be favourable compared to known technology. An aspect of the overall objective is to improve the function and costs of those parts of the locking system that locks in the horizontal direction when panels are pushed against each other.

More specifically an object is to provide a snap locking system where one or several of the following advantages are obtained.

The floor panel should preferably be possible to displace and lock with such a low force that no tools will be needed.

The locking function should be reliable and the vertical and horizontal locking should be strong and prevent that two locked panels will move when humidity is changing or when people walk on a floor.

The locking system should be able to lock floor panels vertically with high precision so that the surfaces are essentially in the same plane.

The locking system should be designed in such a way that the material and production costs could be low.

Another objective is to provide a snap locking system which could be compatible with traditional locking systems.

According to a first embodiment, a flooring system is provided, comprising a plurality of rectangular floor panels with long and short edges, which are mechanically connectable to each other along one pair of adjacent edges. The floor panels are provided with tongue and groove formed in one piece with the panels for mechanically locking together said one pair of adjacent edges at right angles to the principal plane of the panels, thereby forming a vertical mechanical connection between the panels. The panels are provided with a first locking element at one first edge formed in one piece with the panel and a locking groove at an opposite adjacent second edge, the locking groove being open towards a rear side or a front side of the panel. Each panel is provided with a second locking element, formed of a separate material and connected to the locking groove. The first and second locking elements form a mechanical connection locking the panels to each other horizontally parallel to the principal plane and at right angles to the joint edges. The second locking element is flexible and resilient such that two panels, can be mechanically joined by displacement of said two panels horizontally towards each other, while at least a part of the second locking element at said second edges is resiliently displaced vertically, until said adjacent edges of the two panels are brought into engagement with each other horizontally and the second locking element at said second edge is displaced towards its initial position against the first locking element at the first edge.

Although it is an advantage to integrate the flexible locking element with the panel at the factory, the invention does not exclude an embodiment in which flexible locking elements are delivered as separate components to be connected to the panel by the installer prior to installation.

The embodiment allows horizontal and vertical locking of all sides of floor panels with for instance an angling of the long sides, a simple horizontal displacement along the long sides and snapping of the short sides. In this preferred embodiment the flexible locking element is on the short sides. It could be on the long side or on the long and short sides.

The invention is especially suited for use in floor panels, which are difficult to snap for example because they have a core, which is not flexible, or strong enough to form a strong snap locking system. The invention is also suitable for wide floor panels, for example with a width larger than 20 cm, where the high snapping resistance is a major disadvantage during installation, in panels where parts of the locking system is made of a material with high friction, such as wood and in locking systems which are produced with tight fit or without play or even with pretension. Especially panels with such pretension where the locking strip is bent in locked position and presses the panels together are very difficult to displace and snap. A locking system that reduces the snapping resistance will decrease the installation time of such panels considerably.

BRIEF DESCRIPTION OF THE DRAWINGS

FIGS. 2*a-b* Illustrate two embodiments of the invention

FIGS. 3*a-c* illustrate in several steps mechanical joining of floor panels according to an embodiment of the invention.

FIGS. 6*a-e* show embodiments of the invention.

FIGS. 7*a-h* show different embodiments of a flexible locking element.

FIGS. 8*a*-8*c* show locking systems on long and short sides according to embodiments of the invention.

FIGS. 10*a-d* show how the flexible locking element could be used as a flexible tongue enabling a vertical connection according to embodiments of the invention.

DESCRIPTION OF EMBODIMENTS OF THE INVENTION

Figure 1A:
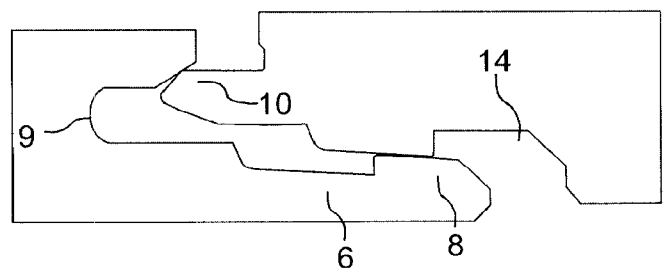
FIGS. 1*a-f* illustrate known systems.
Figure 1B:
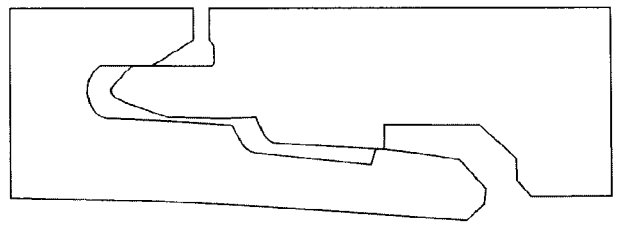
Figure 1C:
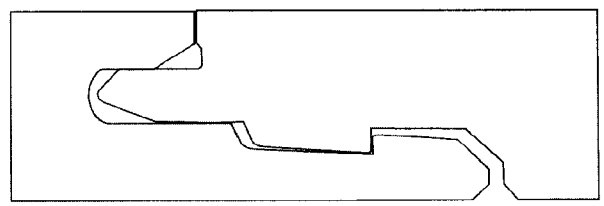
Figure 1D:
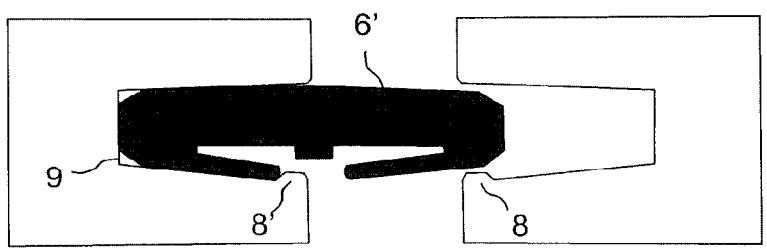
Figure 1E:
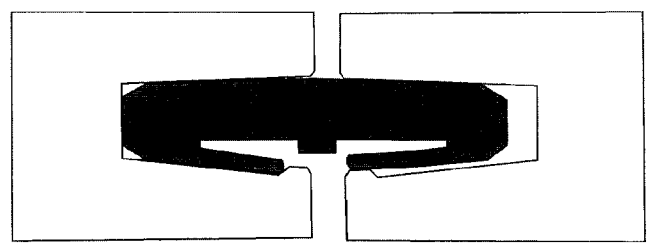
Figure 1F:
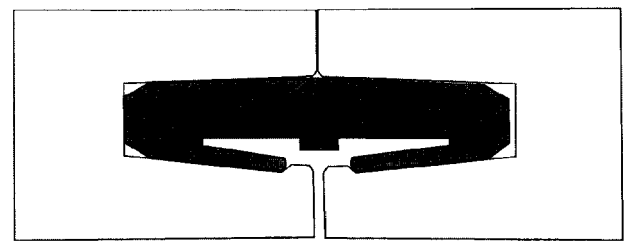

To facilitate understanding, several locking systems in the figures are shown schematically. It should be emphasised that improved or different functions can be achieved using combinations of the preferred embodiments. The inventor has tested all known and especially all commercially used locking systems on the market in all types of floor panels, especially laminate and wood floorings and the conclusion is that at least all these known locking systems which have one or more locking elements cooperating with locking grooves could be adjusted to a system with one or more flexible locking elements according to the invention. Most of them could easily be adjusted in such a way that they will be compatible with the present systems. Several flexible locking elements could be located in both adjacent edges, one over the other or side-by-side. The flexible locking element could be on long and/or short sides and one side with a flexible locking element could be combined with an other side which could have all known locking systems, preferably locking systems which could be locked by angling or a vertical movement. The invention does not exclude floor panels with flexible locking elements on for example a long and a short side. Such panels could be installed by the known snap-snap installation methods. A preferred embodiment is a floorboard with a surface layer of laminate, a core of HDF and a locking system with a flexible locking element on the short side allowing easy snapping combined with a one piece mechanical locking system on long side which could be locked by angling. The long side locking system could have a small play of some 0.01 mm between at least some surfaces which are active in the vertical or horizontal locking such as tongue/groove and or locking element/locking groove. This small play facilitates displacement. Such a floorboard will be very easy to install with angling and snapping. Angles, dimensions, rounded parts etc are only examples and could be adjusted within the principles of the invention.

A first preferred embodiment of a floor panel 1, 1' provided with a mechanical locking system according to the invention is now described with reference to FIGS. 2a-2b.

FIG. 2a illustrates schematically a cross-section of a joint preferably between a short side joint edge 5a of a panel 1 and an opposite short side joint edge 5b of a second panel 1'.

The front sides 61 of the panels are essentially positioned in a common horizontal plane HP, and the upper parts of the joint edges 5a, 5b abut against each other in a vertical plane VP. The mechanical locking system provides locking of the panels relative to each other in the vertical direction D1 as well as the horizontal direction D2.

To provide joining of the two joint edges in the D1 and D2 directions, the edges of the floor panel have a locking strip 6 with a first locking element 8, and a groove 9 made in one piece with the panel in one joint edge 5a and a tongue 10 made in one piece with the panel at an opposite edge 5b. The tongue 10 and the groove 9 and provide the vertical locking D1.

The mechanical locking system comprises a separate flexible second locking element 15 connected into a locking groove 14 formed in the opposite edge 5b of the panel. Parts of the flexible locking element could bend in the length direction and could be displaced in the locking groove. The flexible locking element 15 has a groove portion P1 that is located in the locking groove 14 and a projecting portion P2 projecting outside the locking groove 14. The projecting portion P2 of the second flexible locking element 15, made of a separate material, in one of the joint edges cooperates with a first locking element 8 made in one piece with the panel and formed in the other joint edge.

In this embodiment, the panel 1 could for example have a body or core 60 of wood-fibre-based material such as HDF, plywood or solid wood. The panels 1, 1' could also be made of stone, metal or ceramic materials. These materials are not flexible. The tongue 10 and/or the strip 6 with the locking element 8 could also be made of a separate material connected to the panel.

The flexible locking element 15 has a protruding part P2 with a rounded outer part 31 and a sliding surface 32 which in this embodiment is formed like a bevel.

The first locking element 8 has a first locking surface 20 which cooperates with a second locking surface 22 of the second flexible locking element 15 and locks the joint edges 5a, 5b in a horizontal direction D2. In this embodiment, the locking surfaces 20, 22 are slightly angled (A) against the vertical plane VP. The second locking element 15 will therefore lock as a wedge and tolerances could be eliminated with vertical pre-tension caused by the vertical flexibility of the second flexible locking element.

FIG. 2b shows another embodiment. The inner part P1 of the flexible locking element 15 is fixed in the locking groove 14 and the protruding part P2 could flex vertically towards the locking groove 14 and the inner part P1 and back again towards the first locking element. In this embodiment the bending of the protruding part P2 takes place around a center point CP. The locking surfaces 20, 22 are formed such that they meet each other when the protruding part P2 snaps back towards its initial position.

FIGS. 3a-3c show how the flexible locking element 15 is displaced in the locking groove 14. The flexible locking element 15 is displaced vertically when the displacement surface 32 presses against the bevelled part of the first locking element 8 as shown in FIG. 3a. When the top edges of the panels 1, 1' are in contact or in the intended locked position, the flexible locking element 14 springs back and locks to the first locking element 8 as shown in FIG. 3c.

Figure 4A:
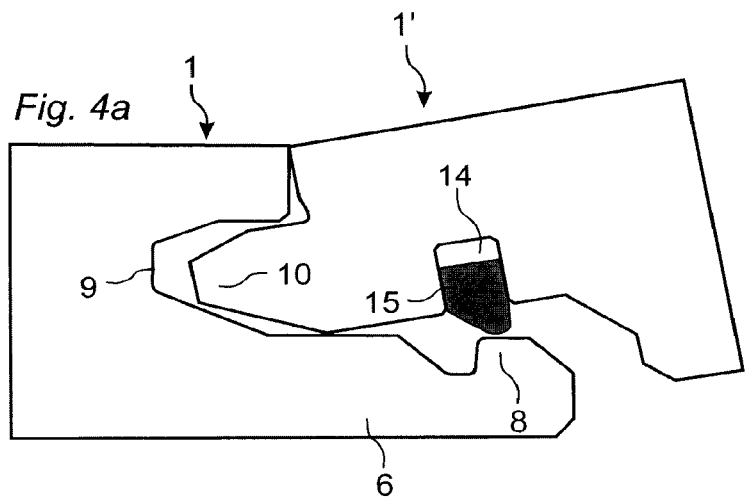
FIGS. 4*a-d* illustrate in several steps mechanical locking and unlocking of floor panels according to an embodiment of the invention.
Figure 4B:
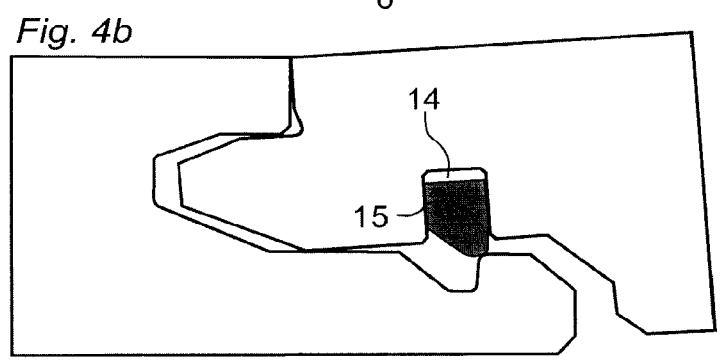
Figure 4C:
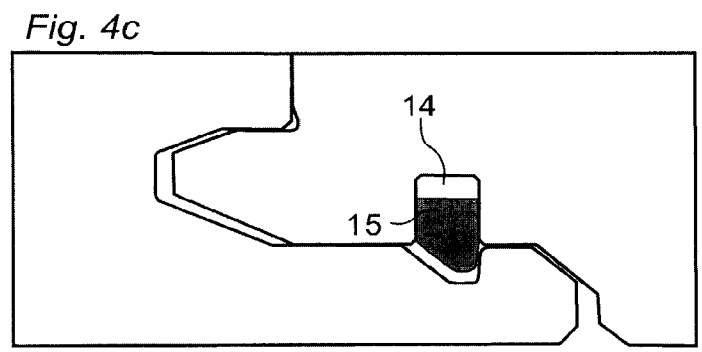
Figure 4D:
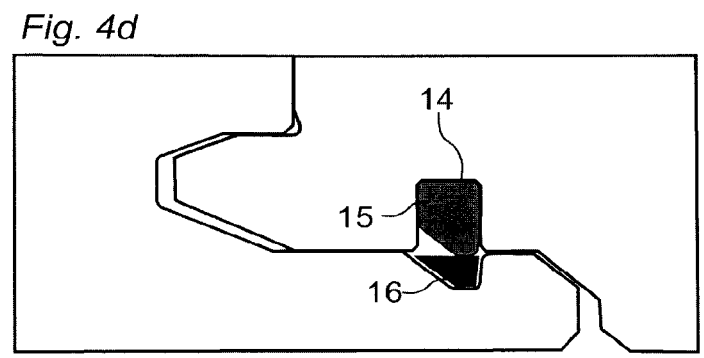

FIGS. 4a-4c show that a locking system with a flexible locking element 15 could also be locked and unlocked with angling. FIG. 4d shows that a locking system with a flexible locking element could be unlocked with a needle shaped tool 16, which is inserted along the joint edge to push back the flexible locking element 14 and to unlock the locking system. Such an unlocking could be used to unlock panels which are installed in a herringbone pattern long side to short side with angling of short sides and snapping of short sides to long side.

Figure 5A:
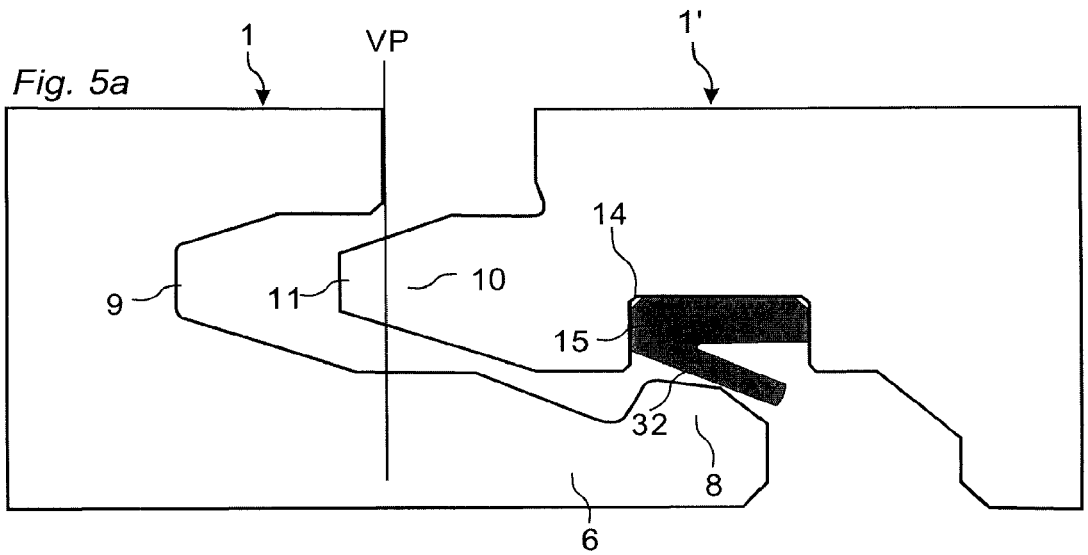
FIGS. 5*a-c* illustrate in several steps mechanical locking of floor panels according to another embodiment of the invention.
Figure 5B:
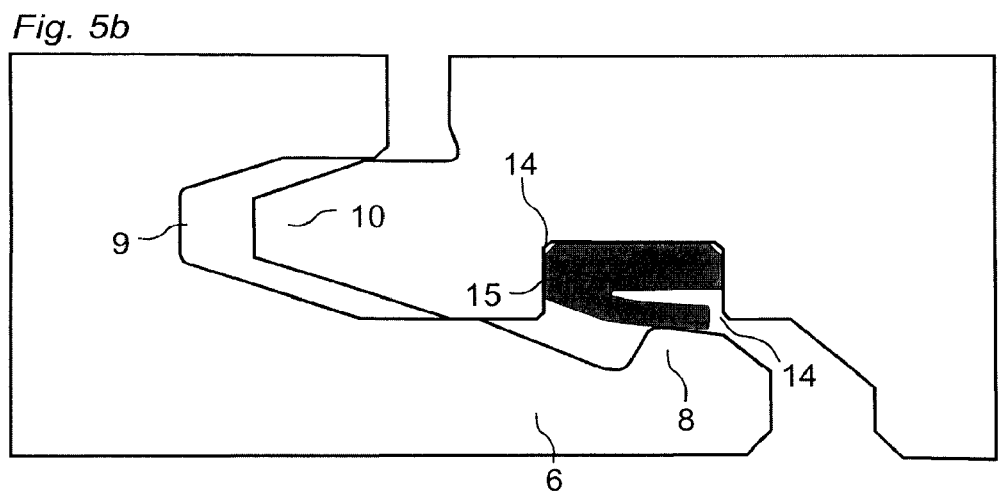
Figure 5C:
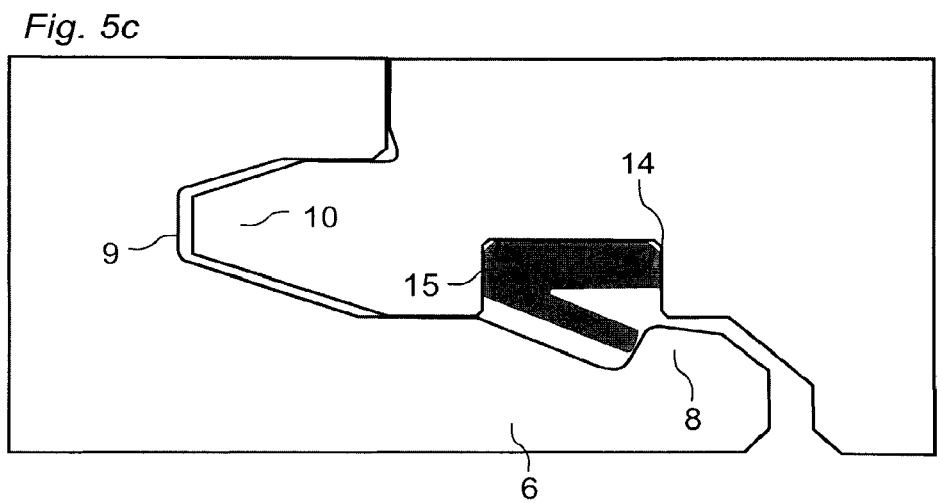
Figure 9A:
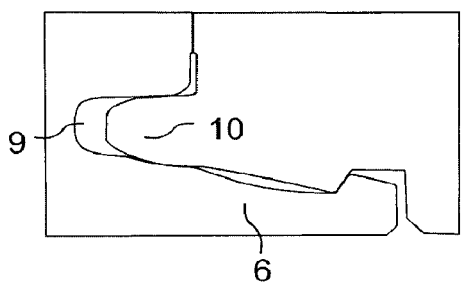
FIGS. 9*a-i* show how known locking systems could be converted to a locking system according to an embodiment of the invention.
Figure 9D:
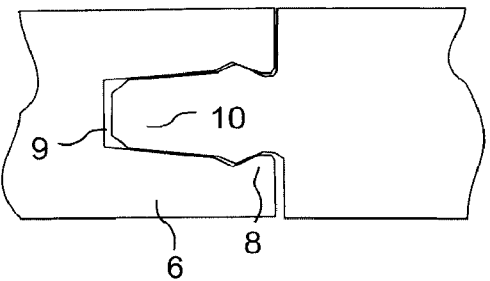
Figure 9B:
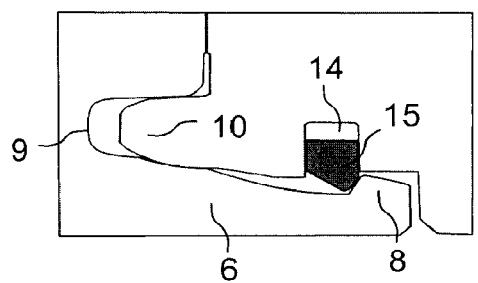
Figure 9E:
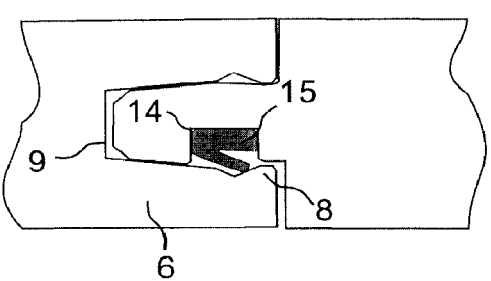
Figure 9C:
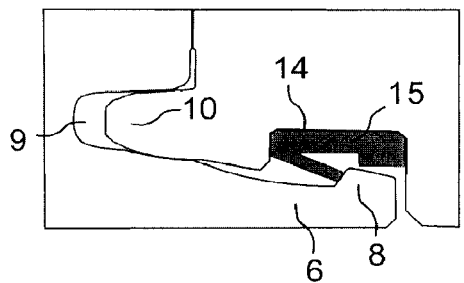
Figure 9F:
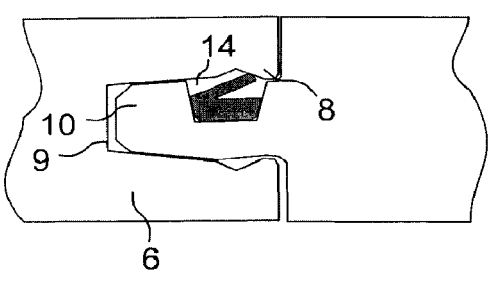
Figure 9G:
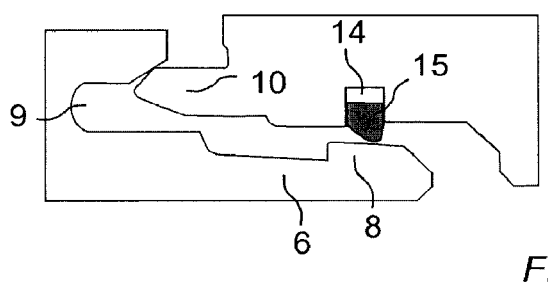
Figure 9H:
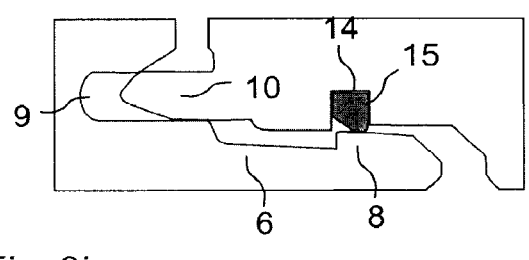
Figure 9I:
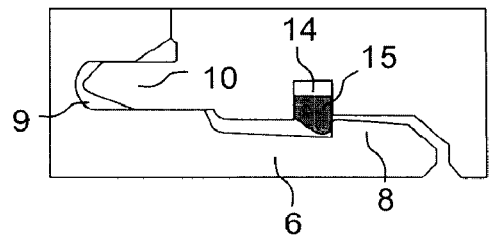

FIGS. 5a-5c show locking according to the embodiment in FIG. 2b. It is an advantage if the tip 11 of the tongue 10 is partly in the groove 9 when the sliding surface 32 is in contact with the locking element 8. This facilitates snapping and installation of the panels.

FIGS. 6a-6e show different embodiments of the invention. FIG. 6a shows a system with two tongues 10, 10' and with a locking groove 14 open towards the front side. FIG. 6b shows a system with the locking groove partly in the part of the tongue 10 which is outside the vertical plane VP. FIGS. 6c and 6d are similar to 6a but these systems have only one tongue. FIG. 6e shows an embodiment according to FIG. 2b but with the locking groove open towards the front side. In this embodiment the floor panel is a parquet floor with a surface layer of wood and a lamella core. The flexible locking element 14 has a protrusion 36 to increase the friction between the flexible locking element 15 and the locking groove 14.

The flexible locking element 15 should preferably be connected to the locking groove with high precision, especially when parts of the flexible locking element 15 are displaced in the locking groove 14 during locking. Depending on the compressibility and friction between the flexible locking element and the locking groove, the flexible locking element as whole or different parts could be connected with a small play, for example 0.01-0.10 mm, a precise fit or a pretension. Wax or other friction reducing materials or chemicals could be applied in the locking groove and/or between the locking elements.

Even with a play, a precise fit between the upper joint edges could be accomplished. The protruding part P2 could be formed to press against the locking surface 20 of the locking element 8. For example the protruding part P2 could be formed with a small angle to the vertical plane VP. The protruding part P2 of the flexible tongue will tilt and press the edges together. The flexible locking element 15 could be formed to cause a permanent pressure force vertically in the locked position. This means that the flexible locking element 15 will only partly spring back to the initial position. The flexible locking element could optionally be designed with such dimensions that after locking it will move slightly towards its initial position. Gradually a perfect connection will be accomplished.

FIGS. 7a-7h shows different embodiments of the flexible locking element 15. In FIG. 7a the flexible locking element 15 is moulded and has on one of the edge sections ES a friction connection 36 which could be shaped for instance as a local small protrusion. This friction connection keeps the flexible locking element in the locking groove 14 during installation, or during production, packaging and transport, if the flexible locking element is integrated with the floor panel at the factory. In FIG. 7b the flexible locking element 15 is an extruded plastic section.

FIG. 7c shows a blank 50 consisting of several flexible locking elements 15 connected to each other. In this embodiment the flexible locking element 15 is made with moulding, preferably injection moulding.

Any type of polymer materials could be used to produce the flexible locking elements such as PA (nylon), POM, PC, PP, PET or PE or similar materials having the properties described above in the different embodiments. These plastic materials could be reinforced with for instance glass fibre. A preferred material is glass fiber reinforced PA.

FIGS. 7d and 7e show a flexible locking element 15 with a length L, middle section MS and edge sections ES. This flexible locking element could bend in the length direction and the protruding part P2 could be displaced vertically in the locking groove if a force F is applied to the protruding part P2. FIG. 7f shows a double tongue 15. FIG. 7g shows an extruded section with a resilient punched inner part P1. FIG. 7h shows a flexible tongue 15 with protruding parts P2 at the edge sections ES.

With these production methods and basic principles a wide variety of complex two and three-dimensional shapes could be produced at low cost. Of course the flexible locking element 15 could be made from metal, preferably aluminium, but wood based sheet material such as HDF and compact laminate could also be used to form flexible locking elements with machining and punching and in combination with for example flexible rubber materials or similar.

FIGS. 8a-8c show how the flexible locking element 15 is connected to a groove 14 at a short side 5a of a floor panel. FIG. 8a shows an embodiment with a flexible tongue as shown in FIG. 7b and FIG. 8b shows an embodiment according to FIG. 7a. FIG. 8c shows a floor panel with a flexible locking element on the short sides 5a, 5b and an angling system C, D on the long sides 4a, 4b. Of course the long sides can also have one or several flexible locking elements. The flexible locking element 15 has in this embodiment a length L that is smaller than the width FL of the floor panel. As a non-restricting example it could be mentioned that sufficient locking strength could be achieved with a flexible locking element with a length L which is smaller than 0.8 times the floor width FW. Even a length L of 0.5 times FW could be sufficient. Such a flexible locking element could have a weight of about 1 gram and the material cost could be considerably lower than for other known technologies where separate materials are used. It is also very easy to connect to the locking element since it is not very important that the flexible locking element is connected at a precise distance from the corner portions 23. A further advantage is that the tongue 10 extends along essentially the whole short side as in traditional floor panels. This gives a strong vertical connection especially at the corner portions 23. Of course the flexible locking element could cover essentially the whole width FW.

The flexible locking element could be connected to the locking groove in several ways. A preferable method is that the flexible locking element is mechanically fixed. Of course glue or mechanical devices can also be used. To simplify the understanding the panel is located with its rear side up and the flexible locking element is on the short side. The panel could also be turned with the front side up. The flexible locking element is separated from blanks 50, if it is moulded, or from rolls if is extruded. It is then pressed or rolled into the locking groove when a short side of the panel is displaced under a fixing unit and the locking element is connected with friction. A lot of alternatives are possible within the main principles that the flexible locking element is separated and fixed with a friction force.

FIGS. 9a to 9i are examples which show that known locking systems, especially traditional snap systems with a bendable strip (9a-9c or 9g-9i) or lip 6 9d-9f) could be adjusted to a snap system with a flexible locking element 14 according to the invention. Generally only a simple adjustment of the locking groove is necessary. It could be made in the same machine and with the same number of cutting tools.

FIGS. 10a-10d show that the principles used in a locking system with a flexible locking element could also be used to replace the tongue 10 with a flexible tongue 30 in order to provide a locking system, which could be locked by vertical folding. One panel 1' could be moved along the vertical plane VP vertically towards another panel 1. The flexible tongue 30 is in this case displaced horizontally according to the same principles as described for the flexible locking element and all embodiments of the flexible locking element could be used. Of course the flexible locking element could be combined with a flexible tongue. Such a locking system could be locked with angling, snapping and vertical folding. FIG. 10d shows that it is an advantage if the flexible tongue 30 on a short side is positioned between the upper and lower parts of the tongue 10' and groove 9' on the long sides. This gives a stronger locking at the corner portions.

Within the invention a lot of alternatives are possible to accomplish snapping with a flexible locking element.

All features of the embodiment described above could be combined with each other or used separately. They could be used on long and/or short sides. The method to produce a separate locking element, which is inserted into a groove, could of course be used to improve friction properties and strength even if the locking element is not flexible or displaceable in the vertical direction. The methods and principles could also be used together with a flexible tongue that could be bent in horizontal direction during locking. The flexible locking element could also be combined with a strip 6 or lip which is partly bent during snapping. The degree of such a bending could be considerable smaller than in present known systems.

The system could be used to connect tile shaped panels installed on a wall. The tiles could be connected to each other and to a locking member fixed to the wall.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

The invention claimed is:

1. A set of floor panels which are mechanically connectable to each other along one pair of adjacent edges, each of said floor panels comprising:
a flexible tongue on a first edge of the panel;
a tongue groove on a second opposite edge of the panel for receiving the flexible tongue of an adjacent panel for mechanically locking together said adjacent edges at right angles to a principal plane of the panels thereby forming a vertical mechanical connection between the panels;
the tongue groove is formed in a core of the panel;

a locking element formed in one piece with the panel at the first edge and a locking groove at the opposite second edge, the locking groove being open towards a rear side of the panel that faces a subfloor;

the locking element and the locking groove form a horizontal mechanical connection, the locking element having a substantially vertical locking surface that is adapted to directly contact a substantially vertical locking surface of the locking groove for locking the panels to each other horizontally parallel to the principal plane and at right angles to the joined first and second edges;

the flexible tongue being resilient and formed of a separate material than the core, and cooperates with the tongue groove;

wherein two of the panels can be mechanically joined together by displacement of said two panels vertically towards each other, while at least a part of the flexible tongue is resiliently displaced horizontally until said adjacent edges of the two panels are brought into engagement with each other vertically and the tongue is then displaced towards its initial position against the tongue groove, and wherein the flexible tongue has an inner part mounted in a sideward open groove in the first edge and a protruding part, the inner part is fixed in the sideward open groove and substantially fills the volume of the sideward open groove.

2. The set of floor panels as claimed in claim 1, wherein the part of the tongue which is resiliently displaced is the protruding part.

3. The set of floor panels as claimed in claim 2, wherein the protruding part is bendable around a center point located at an upper part of the protruding part.

4. The set of floor panels as claimed in claim 2, wherein the protruding part comprises a first locking surface at a lower point of the protruding part and the tongue groove in the second edge comprises a second locking surface at its lower outer part and the first and the second locking surfaces are configured to cooperate to obtain the vertical locking.

5. The set of floor panels as claimed in claim 2, wherein the protruding part has a sliding surface which extends downwards.

6. The set of floor panels as claimed in claim 2, wherein the inner part of the flexible tongue is provided with a protrusion to facilitate a mechanical connection between the flexible tongue and the sideward open groove.

7. The set of floor panels as claimed in claim 1, wherein during the resilient displacement of the flexible tongue the inner part is resiliently displaced.

8. The set of floor panels as claimed in claim 1, wherein the flexible tongue is made of polymer material.

9. The set of floor panels as claimed in claim 8, wherein the polymer material is a thermoplastic material.

10. The set of floor panels as claimed in claim 1, wherein the flexible tongue is of a moulded or extruded polymer material reinforced with glass fibre.

11. The set of floor panels as claimed in claim 10, wherein the polymer material is a thermoplastic material.

12. The set of floor panels as claimed in claim 1, wherein each of the floor panels further comprises a balancing layer on the rear side of the panel and a decorative layer on an opposite front side of the panel, the balancing layer facing a sub floor over which the floor panels are adapted to be provided.

* * * * *

UNITED STATES PATENT AND TRADEMARK OFFICE
CERTIFICATE OF CORRECTION

PATENT NO. : 7,634,884 B2
APPLICATION NO. : 12/051656
DATED : December 22, 2009
INVENTOR(S) : Darko Pervan and Marcus Bergelin It is certified that error appears in the above-identified patent and that said Letters Patent is hereby corrected as shown below:

On the Title Page, item [73]: the Assignee should be changed from "Valinge Innovation AG, Viken (SE)" to --Valinge Innovation AB, Viken (SE)--

Signed and Sealed this

First Day of June, 2010

David J. Kappos
*Director of the United States Patent and Trademark Office*